United States Patent
Aghili et al.

(10) Patent No.: US 10,107,672 B2
(45) Date of Patent: Oct. 23, 2018

(54) SYSTEMS AND METHODS FOR FUEL LEVEL ESTIMATION

(71) Applicant: Ford Global Technologies, LLC, Dearborn, MI (US)

(72) Inventors: Mohammad R. Aghili, Dearborn, MI (US); Aed M. Dudar, Canton, MI (US); Dennis Seung-Man Yang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 15/208,555

(22) Filed: Jul. 12, 2016

(65) Prior Publication Data

US 2018/0017430 A1 Jan. 18, 2018

(51) Int. Cl.
*G01F 25/00* (2006.01)
*B60K 15/035* (2006.01)
*B60K 15/03* (2006.01)

(52) U.S. Cl.
CPC .... *G01F 25/0061* (2013.01); *B60K 15/03519* (2013.01); *G01F 25/0069* (2013.01); *B60K 2015/03019* (2013.01); *B60K 2015/0319* (2013.01); *B60K 2015/03197* (2013.01); *B60K 2015/03203* (2013.01); *B60K 2015/03217* (2013.01); *B60K 2015/03514* (2013.01)

(58) Field of Classification Search
CPC ............. G01F 25/0061; G01F 25/0069; B60K 2015/03019; B60K 2015/03197; B60K 2015/03217
See application file for complete search history.

(56) References Cited

U.S. PATENT DOCUMENTS

| | | | |
|---|---|---|---|
| 8,751,140 B2 | 6/2014 | Sumilla et al. | |
| 8,866,604 B2 | 10/2014 | Rankin et al. | |
| 9,080,529 B1 * | 7/2015 | Klughart | F02D 41/2467 |
| 2005/0246275 A1 * | 11/2005 | Nelson | G06Q 20/102 |
| | | | 705/40 |
| 2009/0056436 A1 * | 3/2009 | Miceli | G01F 9/008 |
| | | | 73/290 R |
| 2011/0012720 A1 | 1/2011 | Hirschfeld | |
| 2013/0173106 A1 * | 7/2013 | Konishi | B60K 6/46 |
| | | | 701/22 |
| 2014/0195101 A1 | 7/2014 | Chen et al. | |

(Continued)

FOREIGN PATENT DOCUMENTS

WO 9940544 8/1999

OTHER PUBLICATIONS

Dudar, Aed M., et al., "Systems and Methods for Preventing Fuel Tank Overfilling," U.S. Appl. No. 14/976,699, filed Dec. 21, 2015, 70 pages.

*Primary Examiner* — Ryan D Walsh
(74) *Attorney, Agent, or Firm* — Julia Voutyras; McCoy Russell LLP

(57) ABSTRACT

Methods and systems are provided for estimating fuel levels in a fuel tank. In one example, a method may comprise adjusting estimates of a fuel level in a fuel tank based on an amount of fuel added to the fuel tank during a refueling event. The amount of fuel added to the fuel tank may be provided by a vehicle operator via one or more of a dashboard user interface, a wireless device user interface, and a digital camera included within a user device.

20 Claims, 5 Drawing Sheets

(56) References Cited

U.S. PATENT DOCUMENTS

| | | | |
|---|---|---|---|
| 2014/0266650 A1* | 9/2014 | Newhouse | G01F 23/0061 340/425.5 |
| 2014/0330506 A1 | 11/2014 | Ng et al. | |
| 2015/0276457 A1* | 10/2015 | Dudar | G01F 23/18 73/290 R |
| 2016/0012465 A1* | 1/2016 | Sharp | G06Q 20/18 705/14.17 |
| 2018/0012204 A1* | 1/2018 | Shetty | G06Q 20/102 |

* cited by examiner

SYSTEMS AND METHODS FOR FUEL LEVEL ESTIMATION

FIELD

The present application relates to systems and methods for estimating fuel levels in a fuel tank.

BACKGROUND/SUMMARY

Accurately determining and indicating an amount of fuel contained within a fuel tank can often be critical for a vehicle operator. The fuel amount may be used to determine when and where the vehicle should be refueled prior to the fuel tank being emptied. A typical fuel tank utilizes a dedicated fuel level sensor, such as a floating sensor coupled to a variable resistor, to determine the amount of fuel remaining in the fuel tank.

However, such fuel level sensors may be prone to sticking, malfunctioning, or decoupling from the vehicle powertrain control module, leading to inaccuracies in the outputs of the sensor. As such, estimates of the fuel level may become inaccurate, and an in-dash fuel gauge may provide an inaccurate or indeterminate fuel level to a vehicle operator. This may lead to the vehicle running out of fuel if the fuel gauge overestimates the amount of fuel remaining in the tank, and/or may lead to increased operator anxiety stemming from not knowing how much fuel is remaining in the tank.

As such, diagnostic tests may periodically be performed on the fuel level sensor. For example, outputs of the fuel level indicator may be monitored over a duration, such as over a period of 100 miles of engine combustion, to determine if the fuel level indicator is stuck or has a worn resistive track. When degradation of the fuel level sensor is detected, a vehicle operator may be alerted so that the sensor may be replaced and/or repaired.

However, the inventors herein have recognized potential issues with such systems. As one example, the fuel gauge may not provide an accurate estimate of the fuel level after degradation of the fuel level sensor is detected. As such, a vehicle operator may not know how much fuel is in the fuel tank until the fuel level sensor is replaced and/or repaired. Thus, the vehicle may be prone to running out of fuel between the time at which degradation of the fuel level sensor is detected, and when the repair and/or replacement of the sensor occurs. Further, the vehicle may be unavailable to the vehicle operator while the sensor is being repaired and/or replaced.

In one example, the issues described above may be addressed by a method comprising receiving a refueling report from the vehicle operator, adjusting an estimated fuel level in a fuel tank based on the refueling report, and adjusting a fuel gauge based on the adjusted fuel level estimate, the fuel gauge providing a visual indication to the vehicle operator of an amount of fuel included in the fuel tank. The refueling report may include an indication of an amount of fuel dispensed into the fuel tank during a refueling event. In particular, the amount of fuel dispensed into the fuel tank may be provided by a fuel reading display of a refueling station. Thus, by receiving an indication of the amount of fuel added to the fuel tank during refueling events, the accuracy of estimates of the fuel level may be increased when a fuel level sensor is determined to be degraded.

In another representation, a method for a vehicle comprises adjusting a fuel level reading displayed to a vehicle operator based on: in a first mode, outputs from a fuel level indicator (FLI) sensor, and in a second mode, an amount of fuel added to a fuel tank during a most recent refueling event, and an amount of fuel consumed since the most recent refueling event. The amount of fuel consumed since the most recent refueling event may be estimated based on a commanded fuel injection amount since the most recent refueling event. Thus, the accuracy of estimates of the fuel level may be increased when a fuel level sensor becomes degraded by adjusting fuel level estimates based on the amount of fuel added to the fuel tank during a refueling event, and based on an amount of fuel consumed by an engine during engine operation.

In yet a further representation, a system comprises a fuel level indicator (FLI) sensor for indicating an amount of fuel included within a fuel tank, a fuel gauge that provides a visual indication of the amount of fuel included within the fuel tank to a vehicle operator, and a controller with computer-readable instructions stored in non-transitory memory for: adjusting the fuel gauge based on outputs from the FLI sensor when the FLI sensor is not degraded, and in response to determining that the FLI sensor is degraded, adjusting the fuel gauge based on a refueling report and an amount of fuel injected by one or more fuel injectors since a most recent refueling of the fuel tank.

In this way, more accurate estimates of the fuel level in a fuel tank may be achieved when a fuel level sensor becomes degraded. In particular, by adjusting fuel level estimates based on an amount of fuel added to the fuel tank during a refueling event, more accurate estimates of the fuel level may be attained after the refueling event. As such, vehicle stalls resulting from fuel exhaustion may be reduced and/or prevented. Additionally, a vehicle operator may delay the replacement and/or repair of a degraded fuel level sensor. Further, by utilizing a fuel reading display of a refueling station which displays the amount of fuel added to the fuel tank, costs incurred from including additional flow meters or devices in the fuel system for measuring the amount of fuel added to the tank during the refueling event may be reduced.

The above advantages and other advantages and features of the present description will be readily apparent from the following detailed description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
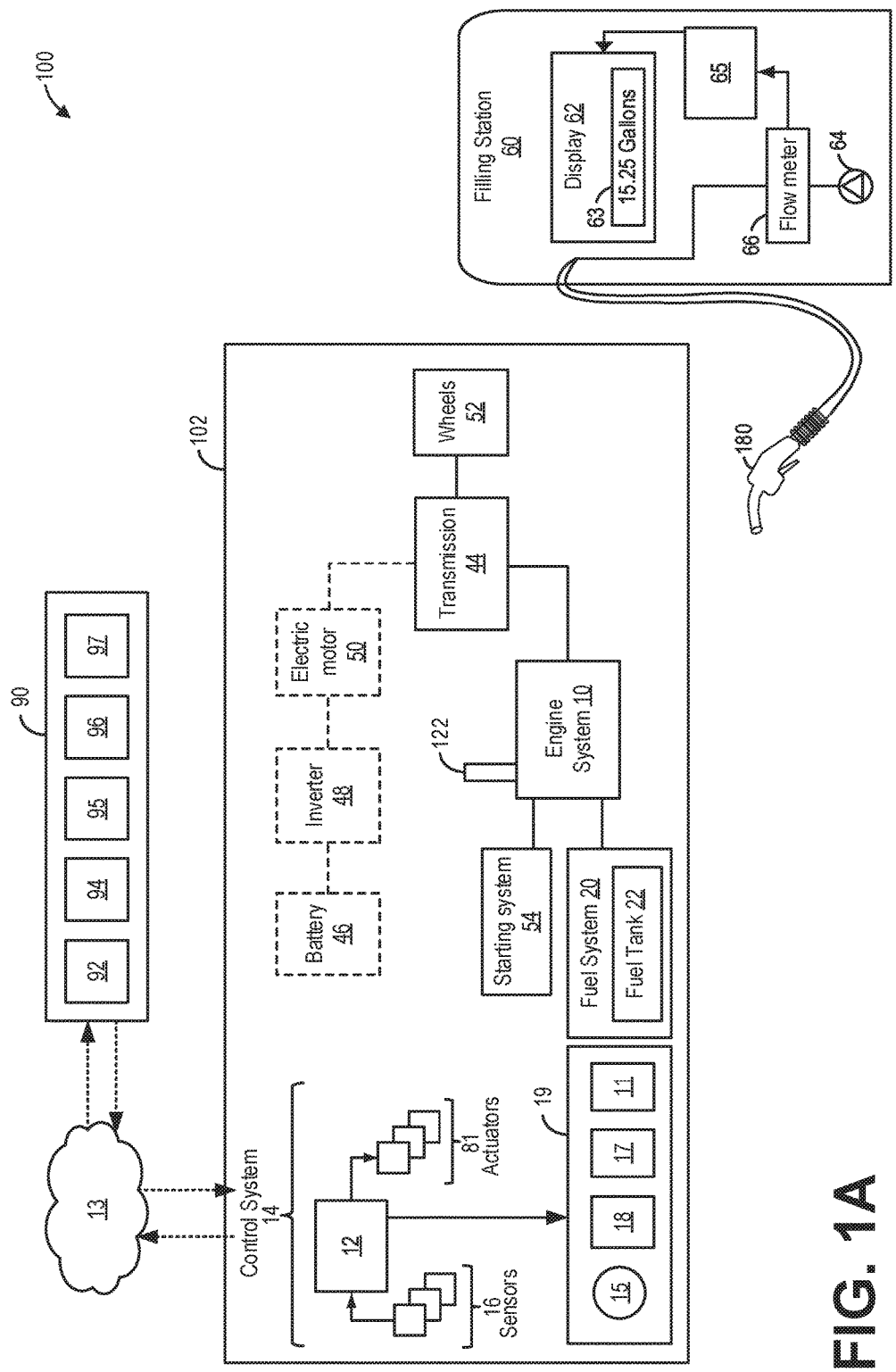
FIG. 1A shows a first schematic diagram of an example vehicle system in communication with a wireless device at a refueling station, in accordance with an embodiment of the present disclosure.
Figure 1B:
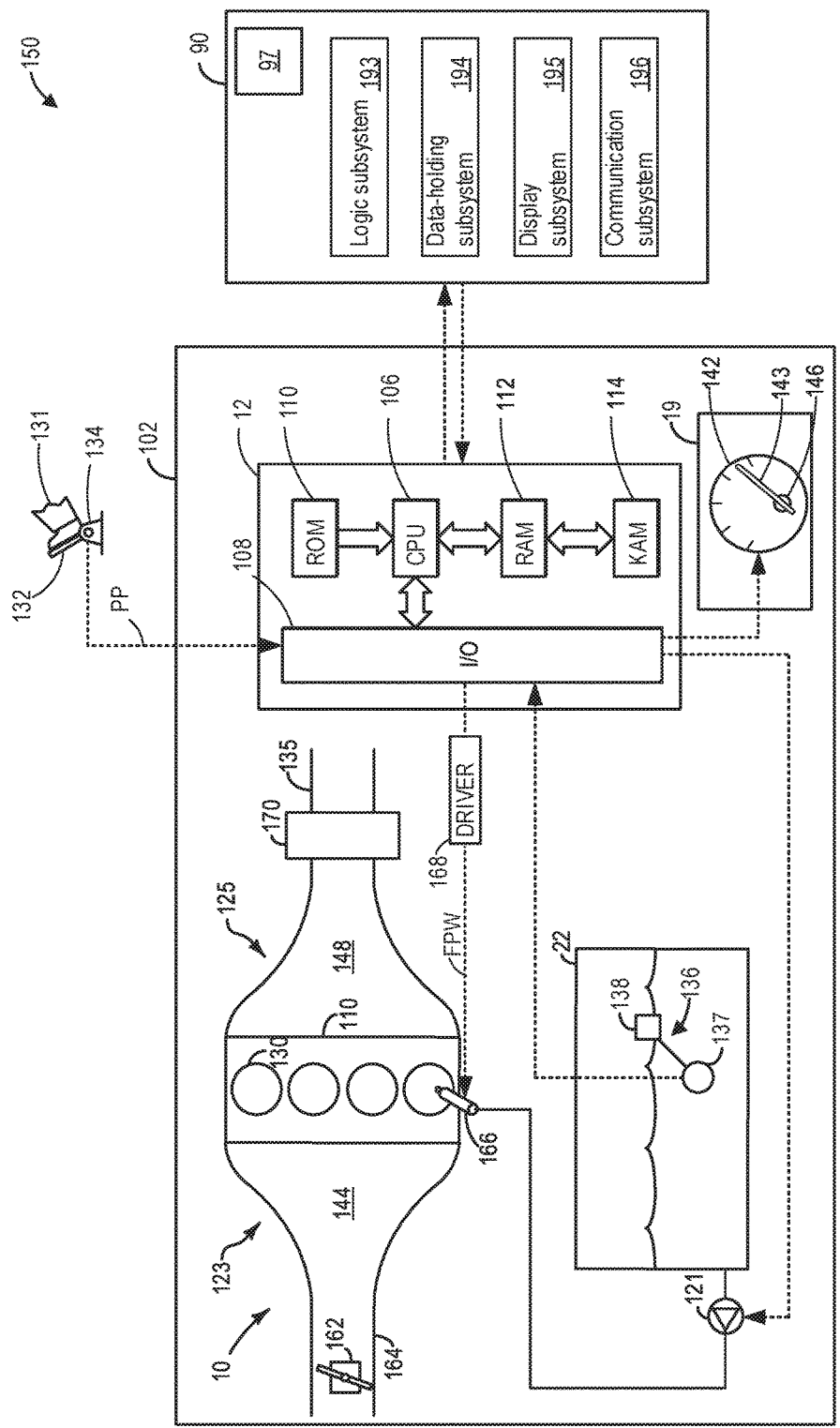
FIG. 1B shows a second schematic diagram of the example vehicle system and wireless device of FIG. 1, in accordance with an embodiment of the present disclosure.
Figure 2:
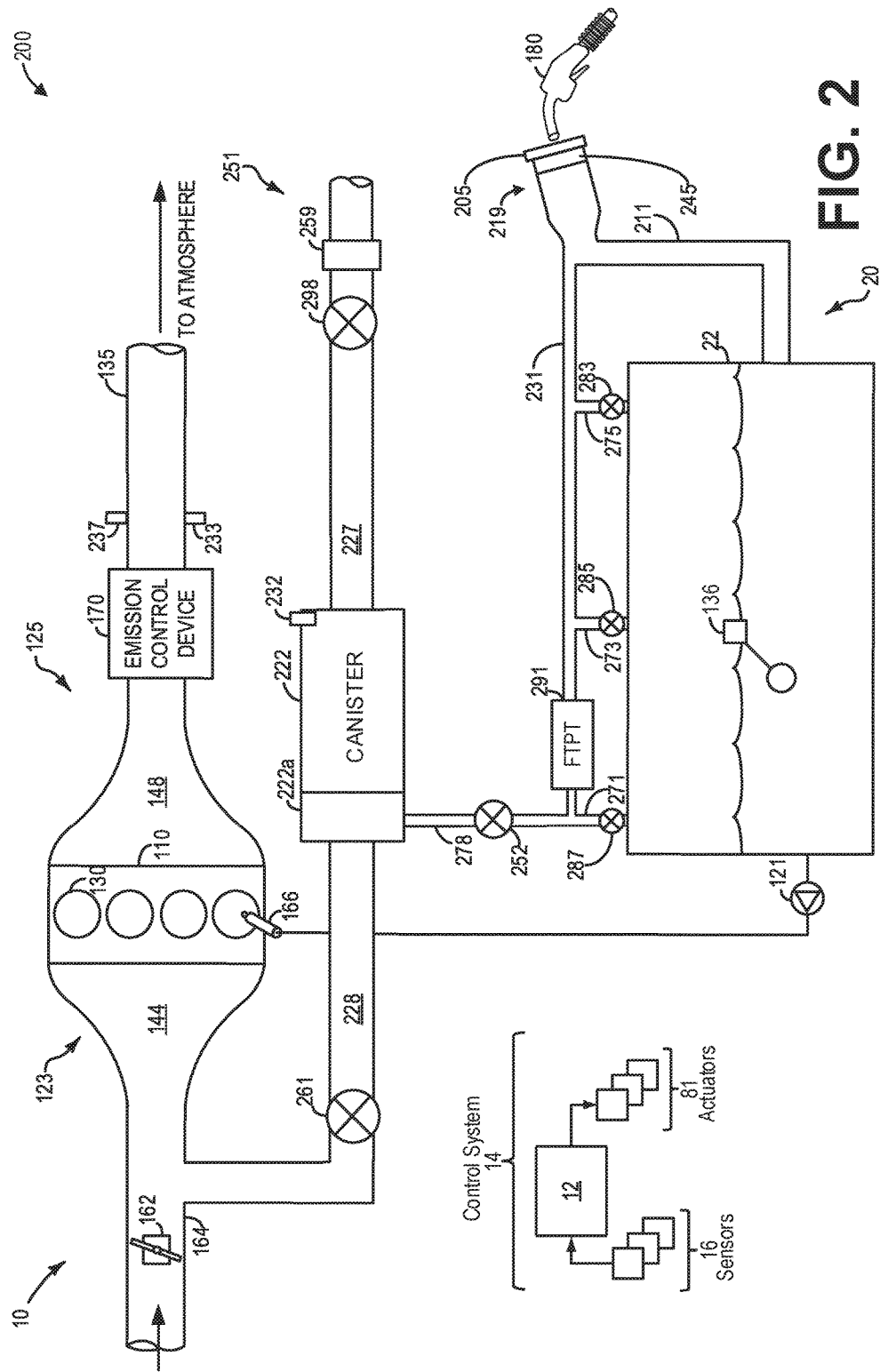
FIG. 2 shows a schematic diagram of an example fuel system which may be included in the vehicle system of FIGS. 1 and 2, in accordance with an embodiment of the present disclosure.

The present description relates to systems and methods for estimating fuel levels in a fuel tank of a fuel system, such as the example fuel system shown in FIG. 2. The fuel tank may include a fuel level indicator (FLI) sensor, which may comprise a float coupled to a variable resistor. The FLI sensor provides an indication of the fuel level to a controller of a vehicle, such as the vehicle system shown in FIGS. 1A and 1B, which may in turn be displayed to a vehicle operator via an in-dash display. However, when the FLI sensor fails, the fuel level provided to the vehicle operator may become inaccurate leading to refueling inefficiencies. In particular, overestimates of the fuel level may result in fuel exhaustion and vehicle stall, and underestimates of the fuel level may lead to excessive visits to refueling stations.

When degradation of the FLI sensor is detected, the fuel level of the fuel tank may instead be estimated based on an amount of fuel consumed during engine operation, and an amount of fuel dispensed into the fuel tank during refueling events. For example, FIG. 3 describes an example method for determining if the FLI sensor is faulty during engine operation, and for requesting a refueling report at a subsequent refueling event if the FLI sensor is faulty. Then, at the following refueling event, an amount of fuel dispensed into the fuel tank may be acquired and used during ensuing engine operation to more accurately estimate fuel levels in the fuel tank. FIG. 4 for example, describes a method for acquiring and processing refueling reports at a refueling station to more accurately estimate fuel levels during engine operation while the FLI is degraded. In this way, the accuracy of fuel level estimates may be substantially maintained after an FLI sensor becomes degraded.

Turning first to FIGS. 1A and 1B, they shows example schematics of a vehicle system that is in communication with a user device, which may be one or more of a smartphone, tablet, laptop, personal computer, or other wireless device. During refueling of one or more fuel tanks of the vehicle system at a refueling station, a vehicle operator may provide an indication of the amount of fuel dispensed into the fuel tanks to a vehicle controller. The controller may then adjust estimates of the fuel level in the fuel tanks based on the amount of fuel dispensed into the tanks during the refueling event. During subsequent engine operation, the controller may continue to estimate fuel levels based on fuel consumption.

When at the refueling station, the vehicle operator may in some examples manually input the amount of fuel dispensed into the fuel tanks. For example, the vehicle operator may manually input the amount of fuel dispensed into the fuel tanks into the user device, which may then be communicated to the vehicle controller via a wireless connection between the user device and the vehicle controller, such as Bluetooth. In another example, the vehicle operator may manually input the amount of fuel dispensed into the fuel tanks directly to the vehicle controller via a user interface of the vehicle system positioned in a cabin and/or on a dashboard of the vehicle system.

However, in other examples, the vehicle operator may capture an image of a fuel station display panel indicating the amount of fuel dispensed into the fuel tanks, via a camera included in the user device. The image of the fuel station display panel may then be processed and analyzed to determine the amount of fuel dispensed into the fuel tanks.

Focusing on FIG. 1A, it shows a first example schematic 100 of a vehicle system 102 in communication with a user device 90. As shown in the example of FIG. 1A, the vehicle system 102 is positioned at a refueling station 60 for refueling of a fuel system 20 of the vehicle system 102. Fuel system 20 is described in greater detail below with reference to FIG. 2.

The vehicle system 102 includes a control system 14 including a vehicle controller 12 which may comprise one or more of a microprocessor, computer, printed circuit board, etc. The controller 12 receives inputs from various sensors 16 and based on the received inputs may adjust operation of various actuators 81 of the vehicle system 102. In particular, the controller 12 may include instructions stored in non-transitory memory for adjusting operation of the various actuators 81 in response to changes in the signals received from the various sensors 16. For example, as described in greater detail below with reference to FIGS. 1B and 2, the controller 12 may adjust estimates of the fuel level in the fuel system 20 based on outputs from a fuel level sensor. Thus, the controller 12 may receive input data from the various sensors 16 or buttons, process the input data, and trigger the actuators 81 in response to the processed input data based on instructions or code programmed therein corresponding to one or more routines. Example control routines are described herein with regard to FIGS. 3 and 4.

The vehicle controller 12 may be in communication with the user device 90 via a wireless and/or wired connection. For example, the user device 90 may be directly connected to the controller 12 via a wired connection by plugging the user device 90 into the vehicle system 102 via an accessory outlet, such as a USB outlet, included within the vehicle system 102, and an electrical cable. In another examples, the user device 90 may be wirelessly connected to the vehicle controller 12 via a network 13, such as one or more of Wi-Fi, Bluetooth, WiMAX, a type of cellular service, a wireless data transfer protocol, and so on. Thus, the user device 90 and vehicle system 102 may each include transceivers for sending and receiving wireless signals (e.g., electromagnetic waves such as radio waves).

The user device 90 may comprise, a processor 92 for executing instructions, a memory 94 for storing said instructions, a user interface 95 for enabling user input (e.g., a keyboard, a touch screen, a mouse, a microphone, a camera, etc.), and a display 96 for displaying graphical information. As such, the user device 90 may comprise any suitable computing device, such as a personal computer (e.g., a desktop computer, a laptop, a tablet, etc.), a smart device (e.g., a smart phone, etc.), and so on.

As described further herein with regard to FIGS. 1B and 2, the control system 14 may be configured to transmit requests for refueling reports via network 13 to the user device 90, which in turn may display the requests for refueling reports to a vehicle operator via display 96. The refueling report may comprise an amount (e.g., volume or mass) of fuel added to the fuel system 20 during a refueling event where fuel is added to the fuel system 20 from filling station 60. Additionally or alternatively, the requests for refueling reports may be displayed to a vehicle operator via a display system 18 included within a dashboard 19 of the vehicle system 102. The display systems 18 and 96 may include one or more of LED, LCD, plasma, or other digital displays.

In response to the requests for refueling reports, a vehicle operator may input an amount of fuel added to the fuel system 20 during a refueling event via the user device 90 and/or the dashboard 19. Specifically, the vehicle operator may input an amount of fuel added to the fuel system 20 during a refueling event via the user interface 95, which may comprise one or more of a touch screen, keyboard, microphone, buttons, etc. Similarly, the vehicle operator may input an amount of fuel added to the fuel system 20 during a refueling event via a user interface 11 included on the dashboard 19, which may comprise one or more of a touch screen, keyboard, microphone, buttons, etc.

Thus, the controller 12 may be electrically coupled to the dashboard 19, including the user interface 11 and display system 18. Thus, the controller 12 may send electrical signals to the display system 18 via a wired connection to adjust the visual display presented on the display system 18 to a vehicle operator. Similarly, the controller 12 may receive input from the vehicle operator via the user interface 11 via a wired electrical connection between the controller 12 and the user interface 11.

In yet another example, the user device 90 may include a camera 97 for capturing digital images. Thus, the camera 97 may be a digital camera. A vehicle operator may use the camera 97 to capture a digital image of all or a portion of a display 62 included in the filling station 60. The filling station 60 may include a gas station that holds large volumes of fuel for dispensing at one or more pumps. Thus, the filling station 60 may include a refueling station used for refueling the fuel system 20 of vehicle system 102. For example, the filling station 60 may comprise a gas station which provides fuel to on-road vehicles at roads, highways, interstates, etc. However, it should be appreciated that in other examples, the filling station 60 may be used to refuel airplanes, trains, trucks, or other vehicles. The filling station 60 may hold liquid fuel such as petrol, diesel, ethanol, blended fuels, etc. In other examples, the filling station 60 may hold gaseous fuel such as propane.

Filling station 60 may include one or more pumps 64 that pump fuel from the filling station 60 to a nozzle 180. The nozzle 180 may be inserted into a fuel tank 22 of the fuel system 20 of the vehicle system 102 to dispense fuel from the filling station 60 into the fuel tank 22. A flow meter 66 may be positioned between the one or more pumps 64 and the nozzle 180 for measuring an amount of fuel dispensed to the fuel tank 22 of the vehicle system 102. In particular, the flow meter 66 may comprise a piston-type positive displacement flow meter. The flow meter 66 may be in electrical communication with an encoder 65, which may convert movement of the flow meter 66 into electrical signals that may be communicated to the display 62. Thus, the display 62 may be in electrical communication with the encoder 65, for receiving electrical signals from the encoder 65 corresponding to an amount of fuel being dispensed to the fuel tank 22. The display 62 may include one or more of an LED, LCD, plasma, or other digital display for numerically presenting the amount of fuel dispensed from the nozzle 180.

Thus, the display 62 may include a fuel reading tab 63 which may present the amount of fuel being dispensed from the nozzle 180 to a vehicle operator. For example, the amount of fuel dispensed into the tank 22 may be presented numerically on the display 62 as a volume (e.g., gallons) and/or mass (e.g., kg). In this way, the vehicle operator may capture an image of the display 62, indicating an amount of fuel dispensed into the fuel tank 22, via the camera 97. The digital image of the dispensed fuel amount may then be converted into a digital signal (e.g., machine-encoded text) corresponding to the numerical amount of fuel dispensed. For example, optical character recognition (OCR) software stored on one or more of the user device 90 and/or vehicle controller 12 may be used to convert the digital image of the display 62 captured by the camera 97 to a digital signal indicating the amount of fuel dispensed from the nozzle 180. Thus, one or more of the user device 90 and/or vehicle controller 12 may convert the image of the display 62 into a digital signal corresponding to a dispensed fuel amount. Controller 12 may then adjust estimates of the fuel level in the fuel tank 22 based on the amount of fuel dispensed into the tank 22 during the refueling event.

The fuel tank 22 may be used to store liquid fuel and provide said fuel to an engine system 10. Engine system 10 may be started with an engine starting system 54, including a starter motor. A speed of the engine system 10 may be estimated based on outputs from a speed sensor 122. For example, the speed sensor 122 may be coupled to a crankshaft of the engine and may record a number of revolutions of the crankshaft. Transmission 44 may be a manual transmission, automatic transmission, or combinations thereof. Transmission 44 may include various components including but not limited to a torque converter, a final drive unit, a gear set having a plurality of gears, and so on. Transmission 44 is shown coupled to drive wheels 52, which may contact a road surface.

In one embodiment, vehicle system 102 may be a hybrid vehicle wherein transmission 44 may alternatively be driven by an electric motor 50. For example, the motor may be a battery-powered electric motor (as depicted) wherein electric motor 50 is powered by energy stored in battery 46. Other energy storage devices that may be used to power motor 50 include a capacitor, a flywheel, a pressure vessel, and so on. An energy conversion device, herein inverter 48, may be configured to convert the DC output of battery 46 into an AC output for use by electric motor 50. Electric motor 50 may also be operated in a regenerative mode, that is, as a generator, to absorb energy from vehicle motion and/or the engine and convert the absorbed energy to an energy form suitable for storage in battery 46. Furthermore, electric motor 50 may be operated as a motor or generator, as required, to augment or absorb torque during a transition of engine system 10 between different combustion modes (e.g., during transitions between a spark ignition mode and a compression ignition mode).

When configured in the hybrid embodiment, vehicle system 102 may be operated in various modes wherein the vehicle is driven by only the engine, only the electric motor, or a combination thereof. Alternatively, assist or mild hybrid modes may also be employed, wherein the engine system 10 is the primary source of torque, and the electric motor 50 selectively adds torque during specific conditions, such as during a tip-in event. For example, during an "engine-on" mode, engine system 10 may be operated and used as the primary source of torque for powering wheels 52. During the "engine-on" mode, fuel may be supplied to engine system 10 from the fuel system 20 including the fuel tank 22. The fuel tank 22 may hold a plurality of fuels, such as gasoline, diesel, or fuel blends, such as a fuel with a range of alcohol (e.g., ethanol) concentrations including E10, E85, and so on, and combinations thereof. In another example, during an "engine-off" mode, electric motor 50 may be operated to power the wheels 52. The "engine-off" mode may be employed during braking, low speeds, while stopped at traffic lights, and so on. In still another example, during an "assist" mode, an alternate torque source may supplement and act in cooperation with the torque provided by engine system 10.

Vehicle system 102 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle.

Dashboard 19 may further include the display system 18 configured to display information to the vehicle operator. Display system 18 may comprise one or more of an LED LCD, plasma, or other digital type of display. In some examples, display system 18 may comprise, a touchscreen display which enables the vehicle operator to view graphical information as well as input commands.

In some examples, the request for a refueling report may be displayed via display system 18. The vehicle operator may in turn interact with the dashboard 19 via the user interface 11. For example, the vehicle operator may manually input an amount of fuel dispensed into the fuel tank 22 during a refueling event via the user interface 11. In some examples, the user interface 11 and display system 18 may be one and the same, such as in examples, where the display system 18 is configured as a touch screen display. Thus, in some examples, the display system 18 may function to both display information to the vehicle operator, and receive operator inputs via the touch screen.

Dashboard 19 may further include an operator ignition interface 15 via which the vehicle operator may adjust the ignition status of the vehicle engine system 10. Specifically, the operator ignition interface 15 may be configured to initiate and/or terminate operation of the vehicle engine system 10 based on an operator input. Various embodiments of the operator ignition interface 15 may include interfaces that require a physical apparatus, such as an active key, that may be inserted into the operator ignition interface 15 to start the engine system 10 and turn on the vehicle, or may be removed to shut down the engine system 10 and turn off the vehicle. Other embodiments may include a passive key that is communicatively coupled to the operator ignition interface 15. The passive key may be configured as an electronic key fob or a smart key that does not have to be inserted or removed from the ignition interface 15 to operate the vehicle engine system 10. Rather, the passive key may need to be located inside or proximate to the vehicle (e.g., within a threshold distance of the vehicle). Still other embodiments may additionally or optionally use a start/stop button that is manually pressed by the operator to start or shut down the engine system 10 and turn the vehicle on or off. Based on the configuration of the operator ignition interface 15, a vehicle operator may provide an indication as to whether the engine system 10 is in an engine-on or engine-off condition, and further whether the vehicle is in a vehicle-on or a vehicle-off condition.

Moving on to FIG. 1B, it shows a second example schematic 150 of the vehicle system 102 and user device 90. In particular, FIG. 1B shows a more detailed schematic of the engine system 10, vehicle controller 12, and user device 90. As described above with reference to FIG. 1A, the fuel tank 22 may provide fuel to the engine system 10. In particular, a pump 121 may be included to pump fuel from the fuel tank 22 to one or more fuel injectors 166. The fuel injectors 166 may be in some example be direct injectors positioned in one or more engine cylinders 130 to inject fuel directly into the cylinders 130. In other examples, one or more of the fuel injectors may be configured as port injectors and may be positioned in an intake system 123 of the engine system 10.

Although only one fuel injector is depicted in FIG. 1B, it should be appreciated that more than one fuel injector may be included in the engine system 10. Specifically, a dedicated fuel injector may be included for each cylinder of the engine system 10. The pump 121 may in some examples be a lift pump. Controller 12 may send electrical signals to the pump 121 to adjust operation (e.g., speed) of the pump 121. In particular, the controller 12 may adjust a speed of the pump 121 based on a desired fuel rail pressure, a desired fuel injection amount, a measured fuel rail pressure, a driver demanded torque, etc. A direct injection pump may additionally be included between the pump 121 and the fuel injectors 166 to increase the pressure of fuel provided to the fuel injectors 166.

The controller 12 may be in electrical communication with the fuel injectors 166 for adjusting an amount of fuel injected into the cylinders 130. In particular, the controller 12 may send electrical signals to a driver 168, which may in turn send a pulse width modulated signal to respective actuators of the fuel injectors 166 for regulating an amount of fuel injected by the injectors 166.

The controller 12 may further receive an indication of fuel levels in the fuel tank 22 from a fuel level sensor 136. Fuel level sensor 136 may also be referred to herein as fuel level indicator (FLI) sensor 136. FLI sensor 136 may comprise a float 138 coupled to a variable resistor 137. The position of the float 138 of the FLI sensor 136 may change as the fuel level in the tank 22 fluctuates, and the resistance of the variable resistor 137 may in turn change depending on the position of the float 138. In particular, the resistance of the variable resistor 137 may increase for decreases in the fuel level of the tank 22. In this way, an amount of fuel in the tank 22 may be inferred by the controller 12 based on the resistance of the variable resistor 137 of the FLI sensor 136. Thus, the resistor 137 may be in electrical communication with the controller 12 and/or fuel gauge 142. The resistor 137 may receive electrical power from a vehicle battery such as battery 46 described above with reference to FIG. 1A.

In some examples, the resistor 137 may be electrically coupled with the controller 12 only, and the voltage and/or current supplied to the controller by the resistor 137 may change depending on the fuel level in the fuel tank 22. Thus, the controller 12 may estimate the fuel level in the fuel tank 22 based on the electrical signals received from the resistor 137 and may adjust the fuel gauge 142 to reflect the estimated fuel level. As such, the controller 12 may adjust the fuel gauge to display to a vehicle operator, the estimated fuel level in the fuel tank 22.

In another example, the resistor 137 may be electrically coupled with the fuel gauge 142 only, and the amount of fuel displayed by the fuel gauge 142 may be adjusted based on an amount of current and/or voltage flowing through the resistor 137.

In yet another example, the resistor 137 may be electrically coupled to the fuel gauge 142 and the controller 12, and thus the fuel gauge 142 may be electrically coupled to the controller 12 and resistor 137. In such examples, the amount of fuel displayed by the fuel gauge 142 may be adjusted based on both electrical inputs received directly from the resistor 137 and based on inputs received from the controller 12.

However, in some examples the controller 12 may receive an indication of fuel levels in the fuel tank 22 from user device 90, such as when it is determined that the FLI sensor 136 is degraded. Specifically, the vehicle operator 131 may input an amount of fuel dispensed into the fuel tank 22 into the user device 90, which may then be communicated to the vehicle controller 12. User device 90 may be any computing device configured to access a network such as network 13 described above with reference to FIG. 1A, including but not limited to a personal computer, a laptop, a smartphone, a tablet, and the like.

Based on outputs from the FLI sensor 136 and/or an indication of an amount of fuel dispensed into the fuel tank 22 during a refueling event via one or more of signals received from user device 90 and/or direct inputs from a vehicle operator via user interface 11 (not shown in FIG. 1B, but described above in FIG. 1A), the controller 12 may adjust a fuel level reading provided to the vehicle operator via a fuel gauge display 142. The fuel gauge display 142 may in some examples be included on the dashboard 19, as shown in the example of FIG. 1B. The fuel gauge display provides a visual representation of an estimated fuel level in the fuel tank 22. Thus, the fuel gauge 142 provides the vehicle operator 131 with an indication of the amount of fuel included in the fuel tank 22.

In some examples, the fuel gauge display 142 may comprise a type of digital display such as LED, LCD, plasma, etc. In such examples where the fuel gauge display 142 is configured as a digital display, the controller 12 may send digital signals to the display 142 to adjust an output of the display corresponding to the fuel level in the fuel tank 22. In some examples, the fuel level in the fuel tank may be presented as a numerical value, such as a number of gallons, or a duration to empty (e.g., miles to empty). However, in other examples, the display may comprise a dial displaying a range of fuel tank levels, with a needle 143 or other indicator that moves along the dial to show the current fuel level in the fuel tank 22. It should be appreciated that other types of displays for displaying the fuel level in the fuel tank 22 may be implemented for the fuel gauge display 142. Thus, the controller 12 may be in electrical communication with the display 142 for adjusting digital images displayed by the display 142 of the current fuel level in the fuel tank 22.

In yet further examples, the fuel gauge display 142 may comprise an analog display, and the needle 143 may be a mechanical needle that rotates or translates via mechanical force from an actuator 146. The controller 12 may adjust the position of the needle 143 by sending signals to the actuator 146, and in response to the signals received from the controller 12, the actuator 146 may adjust a position of the needle 143. For example, the actuator 146 may comprise a solenoid or other electromechanical actuator that may drive mechanical (e.g., rotational) movement of the needle 143 based on electrical signals received from the controller 12.

In further examples, the variable resistor 137 of the FLI sensor 136 may be in direct electrical communication with the display 142 and thus, an amount of fuel displayed by the display 142 may be adjusted based on the resistance of the variable resistor 137. For example, current and/or voltage supplied to the actuator 146 of the needle 143 may change depending on the fuel level in the fuel tank 22, and thus, the position of the needle 143 may change due to the change in voltage and/or current. For example, as the resistance of the variable resistor 137 increases as the fuel level in the fuel tank 22 decreases, current and/or voltage supplied to the actuator 146 may decrease, and thus the needle 143 may rotate or translate to indicate that the fuel level has decreased.

User device 90 includes a logic subsystem 193 and a data-holding subsystem 194. Logic subsystem 193 may be the same or similar to processor 92 described above with reference to FIG. 1A, and data-holding subsystem may be the same or similar to memory 94 described above with reference to FIG. 1A. User device 90 may optionally include a display subsystem 195, which may be the same and/or similar to display subsystem 96 described above with reference to FIG. 1A, communication subsystem 196, and/or other components not shown in FIG. 1A. For example, user device 90 may also optionally include user input devices such as keyboards, mice, game controllers, cameras, microphones, and/or touch screens.

Logic subsystem 193 may include one or more physical devices configured to execute one or more instructions. For example, logic subsystem 193 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 193 may include one or more processors that are configured to execute software instructions. Additionally or alternatively, the logic subsystem 193 may include one or more hardware or firmware logic machines configured to execute hardware or firmware instructions. Processors of the logic subsystem 193 may be single or multi-core, and the programs executed thereon may be configured for parallel or distributed processing. The logic subsystem 193 may optionally include individual components that are distributed throughout two or more devices, which may be remotely located and/or configured for coordinated processing. One or more aspects of the logic subsystem 193 may be virtualized and executed by remotely accessible networking computing devices configured in a cloud computing configuration.

For example, the logic subsystem 193 may be configured to process digital images and convert the digital images to machine-encoded text via one or more optical character recognition (OCR) algorithms. Thus, logic subsystem 193 may convert images acquired by the camera 97 into machine-encoded text. In particular, the logic subsystem 193 may convert images of an amount of fuel dispensed at a refueling station to a machine-encoded numerical value that may be communicated to the vehicle controller 12 to indicate an amount of fuel added to the tank 22 during a refueling event.

Data-holding subsystem 194 may include one or more physical, non-transitory devices configured to hold data and/or instructions executable by the logic subsystem 193 to implement the herein described methods and processes. When such methods and processes are implemented, the state of data-holding subsystem 194 may be transformed (for example, to hold different data). For example, the data-holding subsystem 194 may include OCR algorithms, which may comprise instructions for converting digital images into machine-encoded text. Thus, the logic subsystem 193 may execute the OCR algorithms stored in the data-holding subsystem 194 to convert the digital images acquired by the camera 97 into machine-encoded text.

Data-holding subsystem 194 may include removable media and/or built-in devices. Data-holding subsystem 194 may include optical memory (for example, CD, DVD, HD-DVD, Blu-Ray Disc, etc.), and/or magnetic memory devices (for example, hard drive disk, floppy disk drive, tape drive, MRAM, etc.), and the like. Data-holding subsystem 194 may include devices with one or more of the following characteristics: volatile, nonvolatile, dynamic, static, read/write, read-only, random access, sequential access, location addressable, file addressable, and content addressable. In some embodiments, logic subsystem 193 and data-holding subsystem 194 may be integrated into one or more common devices, such as an application-specific integrated circuit or a system on a chip.

The data-holding subsystem 194 may include one or more web-based applications, search engines, etc. In particular, the data-holding subsystem 194 may include an application that may enable a user to input an amount of fuel added to the fuel tank 22 during a refueling event. Further, the application may enable a user to utilize the camera 97 to capture a digital image of a fuel reading display (e.g., display 62 described above in FIG. 1A) of a refueling station (e.g., filling station 60 described above in FIG. 1A). Thus, a user may open the application on the user device 90 to input a refueling report which may then be transmitted to the controller 12. In particular, the user may input the amount of fuel added to the fuel tank 22 during a refueling event via a user interface such as user interface 95 described above with reference to FIG. 1A.

When included, display subsystem 195 may be used to present a visual representation of data held by data-holding subsystem 194. As the herein described methods and processes change the data held by the data-holding subsystem 194, and thus transform the state of the data-holding subsystem 194, the state of display subsystem 195 may likewise be transformed to visually represent changes in the underlying data. Display subsystem 195 may include one or more display devices utilizing virtually any type of technology. Such display devices may be combined with logic subsystem 193 and/or data-holding subsystem 194 in a shared enclosure, or such display devices may be peripheral display devices. For examples, display subsystem 195 may be used to present a vehicle operator with a request to input a refueling report and indicate an amount of fuel added to the fuel tank 22 during a refueling event. Thus, requests for a refueling report, which may be generated by the vehicle controller 12 and transmitted to the user device 90, may be presented to the vehicle operator on the display subsystem 195. Display subsystem may comprise one or more of a LCD, LED, plasma, or other type of digital display.

When included, communication subsystem 196 may be configured to communicatively couple user device 90 with one or more other computing devices, such as controller 12. Communication subsystem 196 may include wired and/or wireless communication devices compatible with one or more different communication protocols. As non-limiting examples, communication subsystem 196 may be configured for communication via a wireless telephone network, a wireless local area network, a wired local area network, a wireless wide area network, a wired wide area network, etc. Thus, the communication subsystem 196 may comprise a transceiver, that sends and/or receives wireless electromagnetic signals such as Bluetooth, WI-Fi, WiMAX, etc., to transfer digital information between the user device 90 and one or more wirelessly configured devices, such as controller 12. In some embodiments, communication subsystem 196 may allow user device 90 to send and/or receive messages to and/or from other devices via the public Internet.

Engine system 10 may be controlled at least partially by controller 12 and by input from a vehicle operator 131 via an input device 132. In this example, input device 132 includes an accelerator pedal and a pedal position sensor 134 for generating a proportional pedal position signal PP. As such, output from the position sensor 134 may be used to determine the position of the accelerator pedal and/or brake pedal of the input device 132, and therefore determine a desired engine torque. Thus, a desired engine torque as requested by the vehicle operator 131 may be estimated based on the pedal position of the input device 132. Controller 12 may then adjust a position of an intake throttle 162 based on the position of the input device 132 in what is commonly referred to as electronic throttle control (ETC). Further, the controller 12 may adjust an amount of fuel injected to the engine cylinders 130 by the fuel injectors 166 based on the position of the input device 132 and the mass airflow rate to the engine cylinders 130 to achieve a desired air/fuel ratio (e.g., 14.7:1). In particular, the controller 12 may adjust a position of the intake throttle 162 to regulate an amount of air flowing to the cylinders 130 based on the position of the input device 132. The controller may adjust the amount of fuel injected to the cylinders 130 based on one or more of a position of the throttle, a boost pressure, a desired air/fuel ratio, and feedback from an exhaust air/fuel ratio sensor, such as an exhaust oxygen sensor. Thus, the controller 12 may adjust an amount of fuel injected to the cylinders 130 based on a mass airflow rate to the cylinders 130, a desired air/fuel ratio which may be approximately stoichiometric (14.7:1), and feedback from an air/fuel ratio sensor positioned in the exhaust to achieve the desired air/fuel ratio.

Intake throttle 162 may be positioned in an intake passage 164 of engine intake system 123 for regulating an amount of air flowing through the intake system 123 to the engine cylinders 130. Intake air may flow from the intake passage 164 to an intake manifold 144. From the intake manifold, intake air may be directed to the cylinders 130 which may be arranged in a cylinder block 110. The intake air may be combusted with fuel injected by the fuel injectors 166, and may then be exhausted to an exhaust manifold 148 of an engine exhaust system 125, before exiting the engine system 10 via exhaust passage 135. An emission control device 170 may be positioned in the exhaust passage 135 to purify the products of combustions before emission to the atmosphere. In particular, the emissions control device 170 may be a catalyst, such as a three-way catalyst.

Turning now to FIG. 2, it shows a more detailed schematic depiction of the engine system 10 of vehicle system 102 including an evaporative emissions control (EVAP) system 251 and the fuel system 20. The engine system 10 may be coupled to the emissions control system 251 and fuel system 20. Emission control system 251 includes a fuel vapor container or canister 222 which may be used to capture and store fuel vapors.

The engine system 10 includes the cylinder block 110, comprising the cylinders 130. The engine system 10 includes the engine intake system 123 and the engine exhaust system 125. The engine intake system 123 includes throttle 162 fluidly coupled to the engine intake manifold 144 via the intake passage 164. The engine exhaust system 125 includes the exhaust manifold 148 leading to the exhaust passage 135 that routes exhaust gas to the atmosphere. The engine exhaust system 125 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 20 may include a fuel tank 22 coupled to the fuel pump 221. The fuel pump 121 may include one or more pumps for pressurizing fuel delivered to the injectors 166 of engine system 10. It will be appreciated that fuel system 20 may be a return-less fuel system, a return fuel system, or various other types of fuel system. Fuel tank 22 may hold a plurality of fuel blends, including fuel with a range of alcohol concentrations, such as various gasoline-ethanol blends, including E10, E85, gasoline, etc., and combinations thereof. The fuel level sensor 136 may be positioned within the fuel tank 22 and may provide an indication of the fuel level ("Fuel Level Input") to controller 12. As depicted, fuel level sensor 136 may comprise a float 138 connected to a variable resistor 137. Alternatively, other types of fuel level sensors may be used.

Vapors generated in fuel system 20 may be routed to the evaporative emissions control system 251 which includes fuel vapor canister 222 via vapor recovery line 231, before being purged to the engine intake system 123. Vapor recovery line 231 may be coupled to fuel tank 22 via one or more conduits and may include one or more valves for isolating the fuel tank during certain conditions. For example, vapor recovery line 231 may be coupled to fuel tank 22 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a refueling system 219. In some examples, refueling system may include a fuel cap 205 for sealing off the fuel filler system from the atmosphere. Refueling system 219 is coupled to fuel tank 22 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

However, in other examples, refueling system 219 may be a capless refueling system, and may not include fuel cap 205. In such embodiments, refueling access seal (fuel cap 105) may be considered a refueling access door located in the body panel of the vehicle and refueling lock 245 may lock the refueling access door.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 12, for example, when a fuel tank pressure decreases below a pressure threshold and a vehicle operator requests for the lock 245 to be unlocked. In embodiments where refueling lock 245 is locked using a mechanical mechanism, refueling lock 245 may be unlocked via a pressure gradient, for example, when a fuel tank pressure decreases to atmospheric pressure.

A refueling event may comprise the insertion of nozzle 180 into the refueling system 219, and/or the dispensing of fuel into the fuel tank 22. The controller 12 may determine that a refueling event is occurring based on a fuel tank refueling request from a vehicle operator. For example, may unlock and/or request to unlock the refueling lock 245 via one or more input devices (e.g., user interface 11 described above in FIG. 1A) positioned on a dashboard of the vehicle cabin. A refueling event may thus be detected when a vehicle operator unlocks the refueling lock 245. In another example, a vehicle operator may request a refueling event via the one or more input devices. In yet another example, a refueling event may be detected based on a change in pressure in the fuel tank 22. In yet further examples, the refueling system 219 may include a position sensor that detects when the nozzle 180 is inserted into the refueling system 219. A refueling event may be determined to be occurring when the nozzle 180 is inserted into the refueling system 219.

Emissions control system 251 may include one or more emissions control devices, such as fuel vapor canister 222 filled with an appropriate adsorbent, the canister 222 may be configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 20.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister 222. In comparison, during canister purging, fuel vapors are first desorbed from the canister (e.g., to a threshold amount) before being desorbed from the buffer. In other words, loading and unloading of the buffer 222a may not linear with the loading and unloading of the canister 222. As such, the effect of the canister buffer 222a may be to dampen fuel vapor spikes flowing from the fuel tank to the canister 222, thereby reducing the possibility of fuel vapor spikes going to the engine system 10.

The canister 222 may include one or more sensors for estimating an amount of fuel vapors stored in the canister 222. For example, the canister 222 may include one or more temperature sensors and/or pressure sensors. As fuel vapor is adsorbed by the adsorbent in the canister, heat may be generated (heat of adsorption). Likewise, as fuel vapor is desorbed by the adsorbent in the canister, heat may be consumed. Thus, an increase in fuel vapor levels in the canister 222 may be proportional to an increase in temperature. In the example of FIG. 2, the canister 222 may include a temperature sensor 232. In this way, the adsorption and desorption of fuel vapor by the canister may be monitored and estimated based on temperature changes within the canister 222 as inferred based on outputs from the temperature sensor 232.

Vent line 227 may allow fresh air to be drawn into canister 222 when purging stored fuel vapors from fuel system 20 to engine intake system 123 via purge line 228 and purge valve 261. For example, purge valve 261 may be normally closed but may be opened during certain conditions so that vacuum from engine intake manifold 144 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 298 coupled within vent line 227. When included, the canister vent valve 298 may be a normally open valve, so that fuel tank isolation valve 252 (FTIV) may control venting of fuel tank 22 with the atmosphere. Canister vent valve (CVV) 298 may function to adjust a flow of air and vapors between canister 222 and the atmosphere. The CVV may also be used for diagnostic routines. When included, the CVV 298 may be opened during fuel vapor storing operations (for example, during fuel tank refueling and while the engine is not running) so that air, stripped of fuel vapor after having passed through the canister, can be pushed out to the atmosphere. Thus, when the FTIV 252 is opened to discharge fuel vapors from the fuel tank 22 to the canister 222, the CVV 298 may be opened to facilitate the flow of gasses from the fuel tank 22 to the canister 222. The canister 222 may trap fuel vapors in the gasses received from the fuel tank 22, and the remaining air stripped of fuel vapors, may pass out of the vent line 227, through the open CVV 298 to the atmosphere. Further, the CVV 298 may be opened during canister purging operation, when the CPV 261 is open, and fuel vapors in the canister 222 are being purged to the engine intake system 123, to facilitate the desorption of fuel vapors from the canister 222.

FTIV 252 may be positioned between the fuel tank and the fuel vapor canister within conduit 278. FTIV 252 may be a normally closed valve, that when opened, allows for the venting of fuel vapors from fuel tank 22 to canister 222. Fuel vapors may then be vented to atmosphere, or purged to engine intake system 123 via canister purge valve 261. An amount of fuel vapors in the fuel tank 22 may be estimated based on a pressure in the fuel tank 22. The fuel tank pressure may be estimated based on outputs from a fuel tank pressure transducer (FTPT) 291. Thus, the FTPT or pressure sensor 291 may provide an indication of the pressure in the fuel tank 22. The FTIV may be opened when the amount of fuel vapors and/or a pressure in the fuel tank 22 increases above a threshold.

Fuel system 20 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 252 while closing canister purge valve (CPV) 261 to direct refueling vapors into canister 222 while preventing fuel vapors from being directed into the intake manifold 144.

As another example, the fuel system may be operated in a refueling mode (e.g., when fuel tank refueling is requested by a vehicle operator), wherein the controller 12 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 261 while closing isolation valve 252. Herein, the vacuum generated by the intake manifold of the operating engine may be used to draw fresh air through vent line 227 and through fuel vapor canister 222 to purge the stored fuel vapors into intake manifold 144. In this mode, the purged fuel vapors from the canister 222 are combusted in the engine. The purging may be continued until the stored fuel vapor amount in the canister is below a threshold.

Controller 12 may comprise a portion of the control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 237 located upstream of the emission control device, temperature sensor 233, pressure sensor 291, and canister temperature sensor 232. Other sensors such as pressure, temperature, air/fuel ratio, and composition sensors may be coupled to various locations in the vehicle system 10. As another example, the actuators may include fuel injectors 166, throttle 162, fuel tank isolation valve 252, pump 121, and refueling lock 245. Temperature sensor 233 may be positioned in the exhaust passage 135 for providing an indication of the exhaust gas temperature. Further, exhaust gas sensor 237 may comprise an oxygen sensor or air/fuel ratio sensor, and may provide an indication of the air/fuel ratio of the gas mixture in the cylinders 130. Thus, based on output from the exhaust gas sensor 237, the controller may adjust an amount of fuel injected by the injectors 166 to the cylinders 130 to maintain an approximately stoichiometric mixture.

Figure 3:
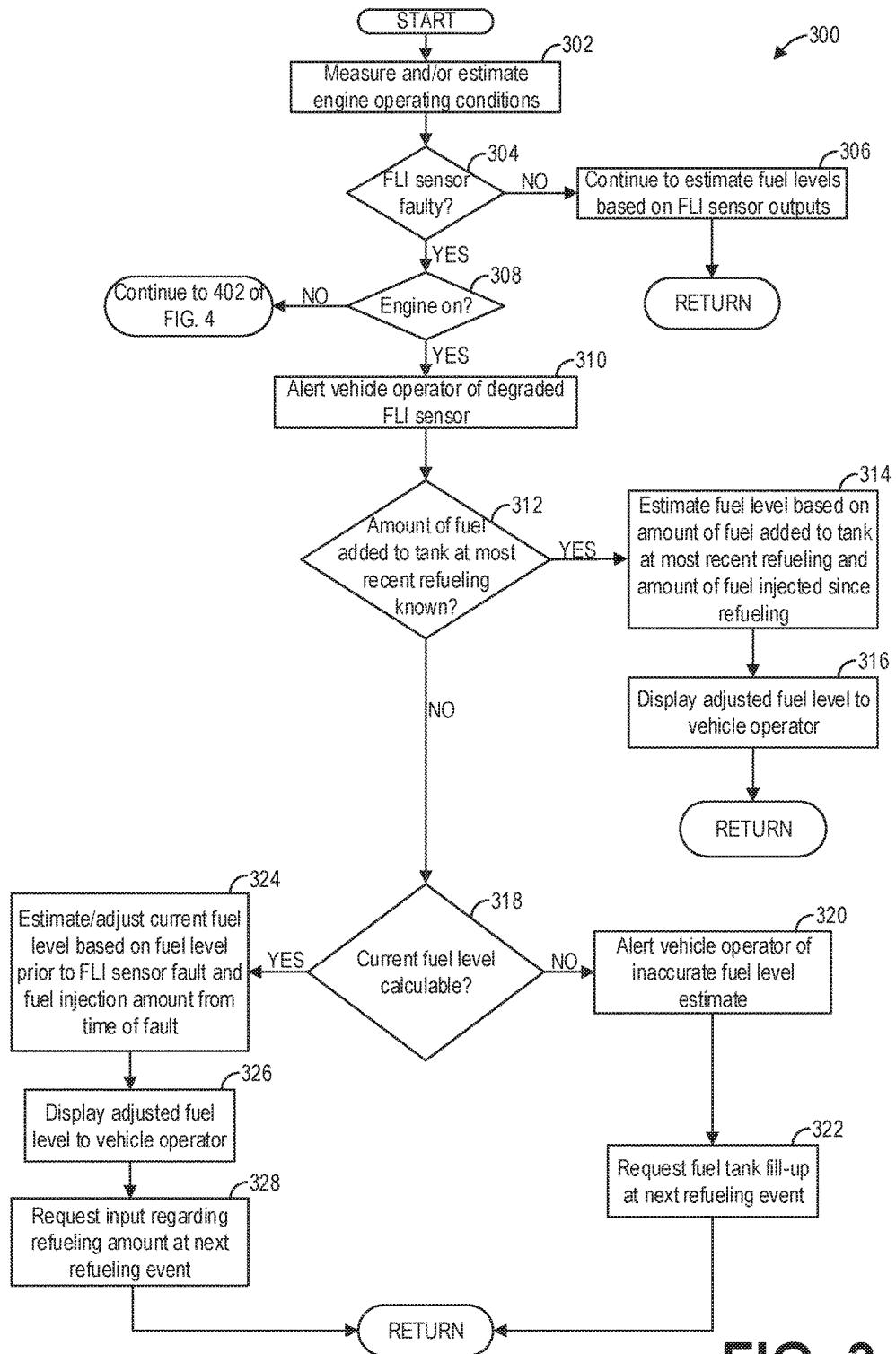
FIG. 3 shows a flow chart of an example method for estimating a fuel level of a fuel tank when an engine is on, in accordance with an embodiment of the present disclosure.
Figure 4:
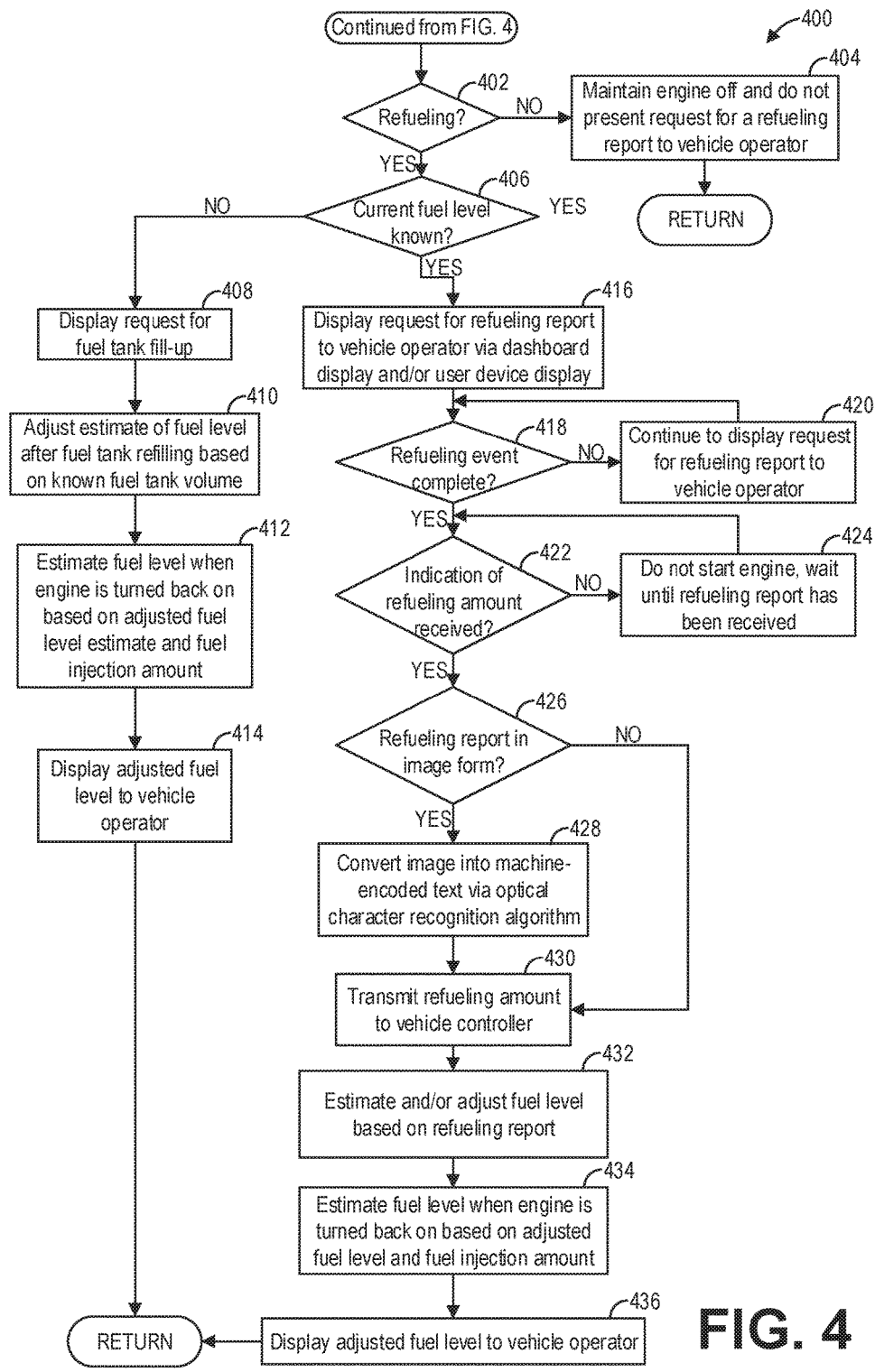
FIG. 4 shows a flow chart of an example method for adjusting estimates of a fuel level of a fuel tank after a refueling event, in accordance with an embodiment of the present disclosure.

Turning now to FIGS. 3 and 4, they show example routines for estimating fuel levels in a fuel tank (e.g., fuel tank 22 described above in FIGS. 1A-2). In particular, FIG. 3, it shows a first example method 300 for estimating fuel levels in a fuel tank (e.g., fuel tank 22 described above in FIGS. 1A-2) during engine operating conditions when an engine (e.g., engine system 10 described above in FIGS. 1A-2) is on and running. FIG. 4 shows a second example method 400, for adjusting estimates of the fuel level in the fuel tank during a refueling event.

Thus, methods 300 and 400 described in FIGS. 3 and 4 respectively, may be stored in non-transitory memory of a vehicle controller (e.g., controller 12 described above in FIGS. 1A-2), and may be executed by the controller in conjunction with signals received from various vehicle, such as the sensors described above with reference to FIGS. 1A-2. The controller may employ engine actuators of the engine system to adjust engine operation, according to the methods described below. For example, the controller may adjust a fuel level reading displayed on a fuel gauge (e.g., fuel gauge display 142 described above in FIG. 1B) based on outputs received from a fuel level indicator sensor (e.g., FLI sensor 136 described above in FIGS. 1B and 2) and/or input received from a vehicle operator (e.g., vehicle operator 131 described above in FIG. 1B) via one or more of a dashboard user interface (e.g., user interface 11 described above in FIG. 1A) and/or a user device (e.g., user device 90 described above in FIGS. 1A and 1B).

Thus, in the description herein, adjusting the fuel level reading may comprise the controller sending digital signals to the fuel gauge to adjust the digital display of the fuel level provided by the fuel gauge, in examples where the fuel gauge is configured as a digital display. However, in examples where the fuel gauge includes an analog needle (e.g., needle 143 described above in FIG. 1B), the adjusting the fuel level reading may comprise sending signals to an actuator (e.g., actuator 146 described above in FIG. 1B) of the needle, to adjust a position of the needle.

Focusing now on FIG. 3, it shows the example method 300 for estimating fuel levels in the fuel tank when the engine is on and spinning. Method 300 begins at 302 which comprises measuring and/or estimating engine operating conditions. Engine operating conditions may include one or more of an engine speed, driver demanded torque which may be estimated based on a position of an accelerator pedal (e.g., input device 132 described above in FIG. 1B), air/fuel ratio, fuel injection amount, intake throttle position, intake mass airflow, boost pressure, exhaust gas temperature, fuel level in the fuel tank, etc.

After measuring and/or estimating engine operating conditions, method 300 may continue from 302 to 304 which comprises determining if the fuel level indicator (FLI) sensor is faulty. For example, outputs from the FLI sensor may be monitored over a duration and compared to predicted values for the FLI sensor that would be expected based on fuel injection amounts over the duration, to determine if the FLI sensor is faulty. The duration may be one or more a number of engine rotations, engine drive cycles, an amount of time, a number of miles driven, etc. As one example, it may be determined that the FLI sensor is stuck, and therefore faulty, if the outputs of the sensor have not changed by more than a threshold over the duration. In another example, if the vehicle has been driven for a threshold number miles without a FLI change, it may be determined that the FLI sensor is stuck in range. In yet another example it may be determined that the FLI sensor is faulty when a resistive track (e.g., variable resistor 137 described above in FIG. 1B) has become worn. In another example, during refueling, the FTPT sensor signature may include an initial spike from fuel flashing, followed by a steady-state pressure, followed by a large back pressure spike indicating the end of refueling. The lack of a FLI sensor response in a key-off state when the FTPT sensor is responding may be indicative of a faulty FLI sensor. In yet another example, for plug-in hybrid electric vehicles (PHEVs), fuel may neither be consumed nor replenished if the vehicle is driven in a pure electric mode. Hence, the method looks for an opportunity to diagnose the FLI sensor in the form of expected/predicted fuel slosh movement commensurate to changing vehicle motion such as turning, road grade delta, sudden vehicle acceleration/deceleration, etc. The vehicle's RCM module yields vehicle yaw, roll, and pitch angles. The lack of response in the FLI sensor output when the vehicle is experiencing dynamic motions due to changing terrain and traffic conditions may also be indicative of FLI sensor degradation.

If it is determined that the FLI sensor is not faulty, then method 300 may continue from 304 to 306 which comprises continuing to estimate fuel levels based on the FLI sensor outputs. Thus, the method 300 at 306 may comprise estimating the fuel levels in the fuel tank based only on outputs from the FLI sensor, and not based on input from the vehicle operator. As such, the method 300 at 306 may comprise displaying the fuel level reading to the vehicle operator via the fuel gauge based on outputs from the FLI sensor and not based on input from a vehicle operator. Method 300 then returns.

However, if it is determined that the FLI sensor is faulty at 304, then method 300 may continue from 304 to 308 which comprises determining if the engine is on. The operational state of the engine (either ON or OFF) may be determined based on a speed of then engine as determine based on outputs from a speed sensor (e.g., speed sensor 122 described above in FIG. 1A). Additionally or alternatively, the operational state of the engine may be determined based on a position of an ignition device (e.g., ignition interface 15 described above in FIG. 1A).

If the engine is off then method 300 may continue from 308 to 402 of FIG. 4, and the method 400 described therein. However, if the engine is on, then method 300 may continue from 308 to 310 which comprises alerting the vehicle operator of the degraded FLI sensor. For example, the alert may be presented to the vehicle operator via a dashboard display (e.g., display system 18 described above in FIG. 1A).

Method 300 may then proceed from 310 to 312 which comprises determining if the amount of fuel added to the tank at a most recent refueling is known. For example, the amount of fuel added to the fuel tank at the most recent refueling event may be communicated to the vehicle controller based on inputs from the vehicle operator. Specifically, as described above with reference to FIGS. 1A and 1B, the vehicle operator may input an amount of fuel added to the fuel tank during a refueling event via the dashboard user interface and/or the user device. If the vehicle operator input the amount of fuel added to the tank during the most recent refueling event, and thus an indication of the amount of fuel added to the tank during the most recent refueling has been received, then method 300 may continue from 312 to 314 which comprises estimating the fuel level based on the amount of fuel added to the tank at the most recent refueling and an amount of fuel injected since the refueling.

Thus, after the refueling event, the amount of fuel in the tank may be estimated based on the amount of fuel added to the tank during the refueling event. As one example, the FLI sensor may not have been degraded prior to the refueling event. Thus, prior to the most recent refueling event, estimates of the fuel level based on outputs from the FLI sensor may have been substantially more accurate than current estimates of the fuel level where the FLI is degraded.

Thus, an estimate of the fuel level following a refueling event and prior to an engine start may be estimated based on the fuel level in the fuel tank prior to the refueling event, and based on the indication of the amount of fuel added to the tank during the refueling event, by for example, adding the amount of fuel dispensed to the tank during the refueling event to the estimated fuel level prior to the refueling event. Fuel levels may then be estimated based during subsequent engine operation based on commanded fuel injection amounts. In particular, fuel level estimates may be reduced in proportion to the amount of fuel leaving the fuel tank via fuel injection. For example, a commanded fuel injection amount over the engine operation since the most recent refueling event may be recorded in non-transitory memory of the controller, for later use in estimating fuel levels when the FLI sensor becomes degraded. In other examples, the fuel injection amount over a most recent engine operating history may be recorded and used to estimate current fuel levels. In this way, estimates of the fuel level from times prior to when the FLI sensor became degraded may be used in conjunction with one or more of the commanded fuel injection history and the amount of fuel added to the tank at the most recent refueling event, to estimate current fuel levels when the engine is on and the FLI sensor has become degraded.

Method 300 may then continue from 314 to 316 which comprises displaying the adjusted fuel level to the vehicle operator via the fuel gauge. Thus, the controller may adjust the fuel level reading displayed on the fuel gauge based on one or more of the amount of fuel added to the tank at the most recent refueling event and/or an amount of fuel injected since the most recent refueling event. Method 300 then returns.

However, if it is determined that the amount of fuel added to the tank at the most recent refueling event is not known at 312, then method 300 may continue from 312 to 318 which comprises determining if the current fuel level is calculable. For example, the current fuel level may be calculable when the fuel level prior to the FLI sensor degradation is known, and/or an amount of fuel injected since the FLI sensor degradation is known. As described above in 314, the commanded fuel injection amount may be recorded for a duration of previous engine operation. For example, the fuel injection amount may be recorded and stored in non-transitory memory for a most recent amount of time, engine cycles, miles driven, etc. If the recorded fuel injection history (e.g., amount of fuel injected over the most recent duration of previous engine operation), does not extend to and/or past the time that the FLI sensor degradation was detected, then the current fuel level may not be calculable. Thus, the current fuel level may be calculable when the amount of fuel injected since the FLI sensor degradation is known.

If it is determined at 318 that the fuel level is not calculable, then method 300 may continue from 318 to 320 which comprises alerting the vehicle operator of inaccurate fuel level estimates. Thus, the method may comprise displaying the alert to the vehicle operator via the dashboard display, to warn the vehicle operator that current fuel level estimates may be inaccurate. The alert may be displayed as one or more of message, a flashing light, an audible sound, etc. Further, the method 300 may continue from 320 to 322 which comprises requesting a fuel tank fill-up at the next refueling event. Thus, the method 300 at 322 may comprise displaying a request to fill up the fuel tank at the next refueling event to the vehicle operator via, for example, the dashboard display. The request may be displayed as a message, flashing light, audible sound, etc. A fuel tank fill-up may comprise filling the tank to a maximum level, where, for example, a fuel pump nozzle (e.g., nozzle 180 described above in FIGS. 1A and 2) may shut-off automatically.

Thus, the controller may send signals to the dashboard display to display the alert that the fuel level estimates are inaccurate and to request a fuel tank fill-up at the next refueling event. By requesting a fill-up at the next refueling event, a new estimate of the fuel level may be obtained based on knowledge of the fuel tank volume. Thus, the fuel level after a fill-up may be known based on the fuel tank volume and/or based on pre-set fuel level values corresponding to the fuel levels in fuel after a fill-up. Said another way, the fuel level after fill-ups may be substantially the same from fill-up to fill-up. By using knowledge of the fuel level after a fill-up, the controller may increase the accuracy of estimates of the fuel level during subsequent engine operation. That is, a more accurate estimate of the fuel level may be determined after a fill-up based on a known fuel level of the fuel tank when filled. Then, during subsequent engine operation the fuel level may be estimated based on an amount of fuel consumed from fuel injection. Method 300 then returns.

Returning to 318, if it is determined that the current fuel level is calculable, then method 300 continues from 318 to 324 which comprises estimating and/or adjusting the current fuel level based on the fuel level prior to the FLI sensor fault, and the fuel injection amount from the time of the fault. Thus, as described above in 314, estimates of the current fuel level may be adjusted based on the fuel level prior to degradation of the FLI sensor, and based on an amount of fuel injected since the fault, which may be determined based on a commanded fuel injection amount since the fault. In particular, the fuel level may be estimated by subtracting the amount of fuel injected since the fault, from the fuel level estimate at or immediately prior to the fault. Thus, the amount of fuel injected since the most recent fuel level estimate from before the FLI sensor fault, may be subtracted from the most recent fuel level estimate from before the FLI sensor fault to determine the current fuel level.

After estimating the current fuel level at 324, method 300 may continue from 324 to 326 which comprises displaying the adjusted fuel level to the vehicle operator. For example, the controller may adjust the fuel level reading displayed on the fuel gauge to reflect the adjusted fuel level.

Further, the method 300 may continue from 326 to 328 which comprises requesting input regarding the refueling amount at the next refueling event. Thus, the controller may send a request to the vehicle operator via the dashboard display to indicate how much fuel has been dispensed into the fuel tank during the next refueling event. The request may be displayed in the form of a message, picture, flashing light, sound, etc. Further, the method 300 at 328 may comprise not starting the engine after the subsequent refueling event until an indication of the amount of fuel dispensed into the fuel tank during the refueling event has been received. In this way, if the current fuel level is calculable during engine operation when the FLI sensor becomes degraded, fuel levels in the fuel tank may continue to be estimated with increased accuracy after a refueling event by commanding a vehicle operator to indicate how much fuel has been added to the fuel tank during the refueling event. Method 300 then returns.

Turning now to FIG. 4, is shows the method 400 which may be executed when the FLI sensor has become degraded and the engine is off. Thus, method 400 may continue 308 of method 300 described above in FIG. 3, when it is determined that the engine is off. Method 400 begins at 402 which comprises determining if a refueling event is occurring. It may be determined that the refueling event is occurring based on one or more of a position of a fuel cap (e.g., fuel cap 205 described above in FIG. 2), a locking state of a refueling lock (e.g., refueling lock 245 described above in FIG. 2), a position of a fuel dispensing nozzle (e.g., nozzle 180 described above in FIGS. 1A and 2), fuel tank pressure as estimated from a fuel tank pressure sensor (e.g., FTPT 291 described above in FIG. 2), etc. In some examples, a refueling event may be determined to be occurring after a vehicle operator requests for the refueling lock to be unlocked via one or more input buttons (e.g., user interface 11 described above in FIG. 1A) included on the dashboard.

If it is determined that a refueling event is not occurring, the method 400 may continue from 402 to 404 which comprises maintaining the engine off and not presenting a request for a refueling report to the vehicle operator. Method 400 then returns.

However, if it is determined that a refueling event is occurring, then method 400 may continue from 402 to 406 which comprises determining if the current fuel level is known. For example the current fuel level may be known when the fuel level after the FLI sensor fault was calculable in the same or similar manner to that described above at 318 and 324 of method 300 in FIG. 3. If the current fuel level is not known (e.g., the fuel injection amount since or before the FLI fault is not known), then method 400 may continue from 406 to 408 which comprises displaying a request for a fuel tank fill-up, in the same or similar manner to that described above with reference to 322 of FIG. 3. Thus, the method 400 at 408 may comprise displaying to the vehicle operator a request to fill up the fuel tank. The request may be displayed to the vehicle operator, for example, via the dashboard display.

After the fuel tank has been filled to its maximum level during the refueling event, method 400 may continue from 408 to 410 which comprises adjusting the estimate of the fuel level based on the known fuel tank volume. As described above with reference to 314 of method 300 in FIG. 3, the fuel tank volume and/or maximum capacity of the fuel tank may be known and may be stored in the memory of the controller. Thus, the fuel level after fill-ups may be substantially the same. As such, the value for the fuel level stored in the memory of the controller that corresponds to the fuel level of the fuel tank when full, may be used to estimate the fuel level after the fuel tank fill-up.

Method 400 may then continue to 412 from 410 which may comprise estimating the fuel level when the engine is turned back on based on the adjusted fuel level estimate and the fuel injection amount. In particular, the fuel level may be estimated by subtracting the amount of fuel injected since the refueling event, from the known fuel level of the fuel tank after a fill-up. The amount of fuel injected since the refueling event may be estimated based on the commanded fuel injection amount. As described above with reference to FIGS. 1B and 2, the commanded fuel injection amount may be a desired amount of fuel to be injected to one or more engine cylinders (e.g., cylinders 130 described above in FIGS. 1B and 2) to achieve a desired air/fuel ratio. Thus, based on a known maximum fill level of a fuel tank, the fuel level after a fill-up may be estimated by subtracting the amount of fuel injected to the engine cylinders from the maximum fill level amount.

Method 400 may then continue from 412 to 414 which comprises displaying the adjusted fuel level to the vehicle operator. Thus, the method 400 at 414 may comprise adjusting the fuel level reading displaying via the fuel gauge based on the commanded fuel injection amount since a most recent fill-up. Method 400 then returns.

Returning to 406, if it is determined that the current fuel level is known, then method 400 may continue from 406 to 416 which comprises displaying a request for a refueling report to the vehicle operator via the dashboard display and/or a display screen (e.g., display subsystem 195 described above in FIG. 1B) of the user device. The request for a refueling report may comprise a request for the vehicle operator to input the amount of fuel (e.g., volume and/or mass of fuel) dispensed into the fuel tank during the refueling event into one or more a dashboard user interface (e.g., user interface 11 described above in FIG. 1A) and a user device interface (e.g., user interface 95 described above in FIG. 1A). For example, the refueling request may comprise a command for the vehicle operator to input a number of gallons dispensed into the fuel tank during the refueling event. In other examples, the refueling request may comprise a command for the vehicle operator to capture a digital image of a gas station display screen (e.g., display 62 described above in FIG. 1A) indicating an amount of fuel dispensed into the fuel tank during the refueling event. The request for the refueling report may be displayed as a message, digital image, audible sound, etc.

Method 400 may then continue from 416 to 418 which comprises determining if the refueling event if complete. The refueling event may be determined to be complete based on the fuel tank pressure. For example the refueling event may be determined to be complete when the rate of increase in fuel tank pressure decreases below a threshold (e.g., fuel tank pressure stops increasing). In another example, the refueling event may be determined to be complete when the refueling lock is adjusted to a locked position, when the nozzle is removed from the fuel system, and/or when an engine start is commanded by the vehicle operator. If the refueling event has not completed, method 400 may continue from 418 to 420 which comprises continuing to display the request for the refueling report to the vehicle operator. Thus, the request for the refueling report may continue to be presented to the vehicle operator for the duration of the refueling event. Method 400 may then return to 418 from 420.

When the refueling event is complete, method 400 may continue from 418 to 422 which comprises determining if an indication of the refueling amount has been received. Thus, the method 400 at 422 may comprise determining if the refueling report has been received from the vehicle operator. If the refueling report has not been received, then method 400 may continue from 422 to 424 which comprises not starting the engine, and waiting to start the engine until the refueling report has been received. Method 400 may thus continue from 424 to 422 and may continue to wait until the refueling report has been received to start the engine.

When the refueling report has been received, method 400 may continue from 422 to 426 which comprises determining if the refueling report is in image form. Thus, the method 400 at 426 may comprise determining the digital form of the refueling report. For example, as described above with reference to FIG. 2, the refueling report may comprise a digital image of a fuel level reading (e.g., fuel reading tab 63 described above in FIG. 1A) presented on the gas station display. In particular, the vehicle operator may capture a digital image of the fuel level reading via a camera (e.g., camera 97 described above in FIGS. 1A and 1B) included on the user device. In other examples, the refueling report may comprise numerical values that may be encoded in machine text. For example, the vehicle operator may input numerical values for the amount of fuel added to the fuel tank during the refueling event via the user device interface and/or dashboard user interface.

If the refueling report is in the form of a digital image, then method 300 may continue from 426 to 428 which comprises converting the digital image into machine-encoded text via an optical character recognition (OCR) algorithm. The OCR algorithm may comprise one or more of matrix matching and/or feature extraction. For example, the OCR algorithm may compare the digital image to one or more stored glyphs on a pixel-by-pixel basis. In another example, the OCR algorithm may decompose glyphs into features such as lines, closed loops, line direction, and line intersections. The decomposed glyphs may then be compared with an abstract vector-like representation of a character, which may be reduced to one or more glyph prototypes. For example, the user device may include the OCR algorithm, and as such, the OCR algorithm may be stored in non-transitory memory (e.g., data-holding subsystem 194 described above in FIG. 1B) of the user device. As such, the user device may convert the digital image of the fuel level reading into machine-encoded text.

Method 400 may then continue from 428 to 430 which comprises transmitting the amount of fuel added to the fuel tank during the refueling event to the vehicle controller. Alternatively, method 400 may continue directly from 426 to 430 if it is determined that the refueling report is not in the form of a digital image. Thus, if the refueling report is provided in text form as a numerical value, then method 400 may proceed directly from 426 to 430 and transmit the refueling amount to the vehicle controller.

In some examples, the transmitting the refueling amount may comprise sending an electrical signal via for example a wire, from the dashboard user interface to the controller. Thus, in examples, where the vehicle operator inputs the refueling report to the dashboard interface, the report may be transmitted directly to the controller via a wired connection. In yet further examples, the user device may be directly coupled to the controller via a wired connection, for example, by plugging the user device into an accessory port such as a USB port via a cable, as described in greater detail above with reference to FIG. 1A. However, in other examples, such as where the vehicle operator inputs the refueling report into the user device, the refueling report may be transmitted to the vehicle controller via wireless signals. Thus, the user device may send the refueling report to the vehicle controller via a wireless signal such as Bluetooth. In some examples, the OCR algorithm may be included in non-transitory memory of the vehicle controller, and the vehicle controller may convert the digital image of the fuel level reading to machine-encoded text.

Method 400 then continues from 430 to 432 which comprise estimating and/or adjusting the fuel level based on the refueling report. In particular, the method 400 at 432 may comprise adjusting the fuel level based on the amount of fuel added to the fuel tank during the refueling event as indicated in the refueling report. Thus, the fuel level after the refueling event may be determined based on the fuel level prior to the refueling event and the amount of fuel added during the refueling event. In particular, the amount of fuel dispensed to the tank during the refueling event may be added to the fuel level of the fuel tank prior to the refueling event.

Method 400 may then continue from 432 to 434 which comprise estimating the fuel level when the engine is turned back on based on the adjusted fuel level and the fuel injection amount in a similar manner to that described at 412. Thus, fuel level may be reduced in proportion to the amount of fuel consumed via fuel injection.

Method 400 may then continue from 434 to 436 which comprises displaying the adjusted fuel level to the vehicle operator. The fuel level reading may be presented to the vehicle operator via the fuel gauge. Method 400 then returns.

In this way, a technical effect of increasing the accuracy of fuel level estimates may be achieved when degradation of a fuel level sensor is detected. By requesting for a vehicle operator to indicate how much fuel is added to a fuel tank during a refueling event, a more accurate estimate of the fuel level after the refueling event is achieved. Further, by then accounting for the loss of fuel due to fuel injection during subsequent engine operation, more accurate estimates of the fuel level may be achieved. As such, a technical effect of preventing and/or reducing engine stalls due to fuel exhaustion may be achieved by increasing the accuracy of fuel level estimates. Further, a technical effect of reducing the frequency of visits to a refueling station may be achieved by increasing the accuracy of fuel level estimates.

Additionally, a vehicle operator may delay the replacement and/or repair of a degraded fuel level sensor. Further, by utilizing a fuel reading display of a refueling station which displays the amount of fuel added to the fuel tank, costs incurred from including additional flow meters or devices in the fuel system for measuring the amount of fuel added to the tank during the refueling event may be reduced.

A method comprises receiving a refueling report from the vehicle operator, adjusting an estimated fuel level in a fuel tank based on the refueling report, and adjusting a fuel gauge based on the adjusted fuel level estimate, the fuel gauge providing a visual indication to the vehicle operator of an amount of fuel included in the fuel tank. In a first example of the method, receiving the refueling report comprises receiving the refueling report via input from the vehicle operator on a user interface of a vehicle dashboard, and where the refueling report comprises a numerical value indicating an amount of fuel dispensed into the fuel tank during a refueling event, and where the refueling report is presented on a display screen of a refueling station. A second example of the method optionally includes the first example and further includes wherein the adjusting the estimated fuel level in a fuel tank based on the refueling report comprises adding the amount of fuel dispensed into the fuel tank during a refueling event to a most recent estimate of the fuel level prior to the refueling event. A third example of the method optionally includes one or more of the first and second examples, and further includes wherein the fuel gauge comprises a dial and mechanically driven needle, and where the adjusting the fuel gauge comprises adjusting an amount of electrical power supplied to an actuator of a fuel gauge needle to adjust the position of the needle to reflect the adjusted fuel level estimate. A fourth example of the method optionally includes one or more of the first through third examples, and further includes wherein the fuel gauge comprises a digital display, and wherein adjusting the fuel gauge comprises adjusting the digital display to reflect the adjusted fuel level estimate. A fifth example of the method optionally includes one or more of the first through fourth examples, and further includes wherein the receiving the refueling report comprises receiving the refueling report from a user device, the user device comprising a wireless device, and where the refueling report is presented on a display screen of a refueling station. A sixth example of the method optionally includes one or more of the first through fifth examples, and further includes wherein the receiving the refueling report from the user device comprises wirelessly receiving the refueling report from the user device via a wireless connection. A seventh example of the method optionally includes one or more of the first through sixth examples, and further includes wherein the receiving the refueling report from the user device comprises receiving the refueling report from the user device via a wired connection. An eighth example of the method optionally includes one or more of the first through seventh examples, and further includes wherein the refueling report is received from the user device via input from the vehicle operator on a user interface of the user device, and where the refueling report comprises a numerical value indicating an amount of fuel dispensed into the fuel tank during a refueling event. A ninth example of the method optionally includes one or more of the first through eighth examples, and further includes wherein the refueling report comprises a digital image of a fuel reading display of a refueling station, the fuel reading display including an indication of an amount of fuel dispensed into the fuel tank during a refueling event, where the digital image is captured via a camera included on the user device. A tenth example of the method optionally includes one or more of the first through ninth examples, and further includes converting the digital image of the fuel reading display into machine-encoded text corresponding to a numerical value of an amount of fuel dispensed into the fuel tank during a refueling event via one or more optical character recognition (OCR) algorithms. An eleventh example of the method optionally includes one or more of the first through tenth examples, and further includes displaying a request for the refueling report to the vehicle operator, and wherein the displaying the request for the refueling report comprises displaying the request for the refueling report on one or more of a first display screen of a vehicle dashboard and a second display screen of a user device, the user device comprising a wireless device.

In another representation, a method for a vehicle comprises adjusting a fuel level reading displayed to a vehicle operator based on: in a first mode, outputs from a fuel level indicator (FLI) sensor, and in a second mode, an amount of fuel added to a fuel tank during a most recent refueling event, and an amount of fuel consumed since the most recent refueling event. In a first example of the method, the method may further comprise, operating in the first mode when the FLI sensor is not degraded, and switching to adjusting the fuel level reading displayed to the vehicle operator based on, in the second mode, the amount of fuel added to the fuel tank during the most recent refueling event, and the amount of fuel consumed since the most recent refueling event, when degradation of the FLI sensor is detected. A second example of the method optionally includes the first example and further includes wherein degradation of the FLI sensor is detected based on one or more diagnostic routines, the diagnostic routines comprising comparing actual outputs of the FLI sensor to predicted outputs of the FLI sensor that would be expected based on fuel consumption rates over a duration of vehicle operation. A third example of the method optionally includes one or more of the first and second examples, and further includes in response to detecting that the FLI sensor is degraded, displaying a request to a vehicle operator to fill up the fuel tank at a subsequent refueling event when one or more of the amount of fuel added to the fuel tank during the most recent refueling event and the amount of fuel consumed since the most recent refueling event are not known. A fourth example of the method optionally includes one or more of the first through third examples, and further includes wherein the amount of fuel consumed since the most recent refueling event is calculated based on a commanded fuel injection history, the commanded fuel injection history including a record of an amount of fuel commanded to be injected by one or more fuel injectors since the most recent refueling event. A fifth example of the method optionally includes one or more of the first through fourth examples, and further includes wherein the amount of fuel added to a fuel tank during a most recent refueling event is provided via input from a vehicle operator via one or more of a dashboard user interface located within the vehicle and a user device interface included within a wireless device.

In yet a further representation, a system comprises a fuel level indicator (FLI) sensor for indicating an amount of fuel included within a fuel tank, a fuel gauge that provides a visual indication of the amount of fuel included within the fuel tank to a vehicle operator, and a controller with computer-readable instructions stored in non-transitory memory for: adjusting the fuel gauge based on outputs from the FLI sensor when the FLI sensor is not degraded, and in response to determining that the FLI sensor is degraded, adjusting the fuel gauge based on a refueling report and an amount of fuel injected by one or more fuel injectors since a most recent refueling of the fuel tank. In a first example of the method, the method may further comprise wherein the refueling report is wirelessly received from a user device in wireless communication with the controller, the refueling report comprising an indication of an amount of fuel added to the fuel tank during the most recent refueling of the fuel tank.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
receiving a refueling report at a controller of a control system included in a vehicle from a vehicle operator via a user interface of a user device or vehicle dashboard in communication with the controller; and
via the controller:
adjusting an estimated fuel level in a fuel tank of the vehicle based on the received refueling report; and
adjusting a fuel gauge of the vehicle based on the adjusted fuel level estimate, the fuel gauge providing a visual indication to the vehicle operator of an amount of fuel included in the fuel tank.

2. The method of claim 1, wherein the receiving the refueling report comprises receiving the refueling report at the controller via input from the vehicle operator on the user interface of the vehicle dashboard, and where the refueling report comprises a numerical value indicating an amount of fuel dispensed into the fuel tank during a refueling event, and where the refueling report is presented on a display screen of a refueling station.

3. The method of claim 2, wherein the adjusting the estimated fuel level in the fuel tank based on the refueling report comprises adding the amount of fuel dispensed into the fuel tank during the refueling event to a most recent estimate of the fuel level prior to the refueling event.

4. The method of claim 1, wherein the fuel gauge comprises a dial and a mechanically driven needle, and where the adjusting the fuel gauge comprises adjusting an amount of electrical power supplied to an actuator of the mechanically driven needle to adjust a position of the needle to reflect the adjusted fuel level estimate.

5. The method of claim 1, wherein the fuel gauge comprises a digital display, and wherein adjusting the fuel gauge comprises adjusting the digital display to reflect the adjusted fuel level estimate.

6. The method of claim 1, wherein the receiving the refueling report comprises receiving the refueling report at the controller from the user device, the user device comprising a wireless device, and where the refueling report is presented on a display screen of a refueling station.

7. The method of claim 6, wherein the receiving the refueling report from the user device comprises wirelessly receiving the refueling report from the user device via a wireless connection.

8. The method of claim 6, wherein the receiving the refueling report from the user device comprises receiving the refueling report from the user device via a wired connection.

9. The method of claim 6, wherein the refueling report is received from the user device via input from the vehicle operator on the user interface of the user device, and where the refueling report comprises the numerical value indicating the amount of fuel dispensed into the fuel tank during the refueling event.

10. The method of claim 6, wherein the refueling report comprises a digital image of a fuel reading display of the refueling station, the fuel reading display including an indication of the amount of fuel dispensed into the fuel tank during the refueling event, where the digital image is captured via a camera included on the user device.

11. The method of claim 10, further comprising converting the digital image of the fuel reading display into machine-encoded text corresponding to the numerical value of the amount of fuel dispensed into the fuel tank during the refueling event via one or more optical character recognition (OCR) algorithms.

12. The method of claim 1, further comprising, via the controller, displaying a request for the refueling report to the vehicle operator, and wherein the displaying the request for the refueling report comprises displaying the request for the refueling report on one or more of a first display screen of the vehicle dashboard of the vehicle and a second display screen of the user device, the user device comprising a wireless device and wherein adjusting the estimated fuel level in the fuel tank of the vehicle based on the received refueling report includes not adjusting the estimated fuel level in the fuel tank based on outputs of a fuel level indicator sensor of the vehicle.

13. A method for a vehicle, comprising:
via a controller of a control system included in the vehicle:
operating the vehicle in a first mode, and, responsive to operating in the first mode, adjusting a fuel level reading displayed to a vehicle operator only based on outputs from a fuel level indicator (FLI) sensor of the vehicle; and
operating the vehicle in a second mode, and, responsive to operating in the second mode, adjusting the fuel level reading displayed to the vehicle operator based on an amount of fuel added to a fuel tank of the vehicle during a most recent refueling event, and an amount of fuel consumed since the most recent refueling event, where the amount of fuel added is provided to the controller via input from the vehicle operator.

14. The method of claim 13, further comprising operating in the first mode when the controller determines that the FLI sensor is not degraded based on outputs of the FLI sensor received at the controller, and switching to adjusting the fuel level reading displayed to the vehicle operator based on, in the second mode, the amount of fuel added to the fuel tank during the most recent refueling event and the amount of fuel consumed since the most recent refueling event, when degradation of the FLI sensor is detected.

15. The method of claim 14, wherein degradation of the FLI sensor is detected, via the controller, based on one or more diagnostic routines, the diagnostic routines comprising comparing actual outputs of the FLI sensor to predicted outputs of the FLI sensor that would be expected based on fuel consumption rates over a duration of vehicle operation.

16. The method of claim 13, further comprising, via the controller, in response to detecting that the FLI sensor is degraded, displaying a request to the vehicle operator to fill up the fuel tank at a subsequent refueling event when one or more of the amount of fuel added to the fuel tank during the most recent refueling event and the amount of fuel consumed since the most recent refueling event are not known.

17. The method of claim 13, wherein the amount of fuel consumed since the most recent refueling event is calculated, via the controller, based on a commanded fuel injection history, the commanded fuel injection history including a record of an amount of fuel commanded to be injected by one or more fuel injectors since the most recent refueling event.

18. The method of claim 13, wherein the input from the vehicle operator is provided via one or more of a dashboard user interface located within the vehicle and a user device interface included within a wireless device.

19. A system included in a vehicle, comprising:
a fuel level indicator (FLI) sensor for indicating an amount of fuel included within a fuel tank of the vehicle;
a fuel gauge that provides a visual indication of the amount of fuel included within the fuel tank to a vehicle operator; and
a controller in communication with the FLI sensor and the fuel gauge and with computer-readable instructions stored in non-transitory memory for:
determining whether the FLI sensor is degraded based on outputs, received at the controller, from the FLI sensor;
in response to determining that the FLI sensor is not degraded, adjusting the fuel gauge only based on outputs from the FLI sensor; and
in response to determining that the FLI sensor is degraded, adjusting the fuel gauge based on a refueling report received at the controller via an input from the vehicle operator and an amount of fuel injected by one or more fuel injectors since a most recent refueling of the fuel tank.

20. The system of claim 19, wherein the refueling report is wirelessly received from a user device of the vehicle operator, the user device in wireless communication with the controller, the refueling report comprising an indication of an amount of fuel added to the fuel tank during the most recent refueling of the fuel tank.

* * * * *